United States Patent
Yellin et al.

(10) Patent No.: US 9,979,796 B1
(45) Date of Patent: May 22, 2018

(54) EFFICIENT PRE-FETCHING NOTIFICATIONS

(71) Applicant: Tensera Networks Ltd., Adanim (IL)

(72) Inventors: Daniel Yellin, Raanana (IL); David Ben Eli, Modiin (IL); Shimon Moshavi, Beit Shemesh (IL)

(73) Assignee: TENSERA NETWORKS LTD., Adanim (IL)

( * ) Notice: Subject to any disclaimer, the term of this patent is extended or adjusted under 35 U.S.C. 154(b) by 0 days. days.

(21) Appl. No.: 15/404,214

(22) Filed: Jan. 12, 2017

Related U.S. Application Data

(63) Continuation-in-part of application No. 14/691,597, filed on Apr. 21, 2015.

(60) Provisional application No. 62/279,773, filed on Jan. 17, 2016, provisional application No. 62/287,918, filed on Jan. 28, 2016, provisional application No. 62/025,021, filed on Jul. 16, 2014, provisional application No. 62/100,933, filed on Jan. 8, 2015.

(51) Int. Cl.
| | |
|---|---|
| *G06F 15/16* | (2006.01) |
| *H04L 29/08* | (2006.01) |
| *G06F 17/30* | (2006.01) |

(52) U.S. Cl.
CPC .... *H04L 67/2847* (2013.01); *G06F 17/30902* (2013.01); *H04L 67/26* (2013.01); *H04L 67/34* (2013.01)

(58) Field of Classification Search
CPC ..... H04L 67/26; H04L 67/34; H04L 67/2847; G06F 17/30902
USPC ........................................................ 709/203
See application file for complete search history.

(56) References Cited

U.S. PATENT DOCUMENTS

| | | |
|---|---|---|
| 6,311,223 B1 * | 10/2001 | Bodin ................. G06F 17/2247 704/9 |
| 6,446,238 B1 | 9/2002 | Canestaro et al. |
| 8,089,892 B2 | 1/2012 | Liu et al. |
| 8,341,245 B1 | 12/2012 | Roskind et al. |
| 8,447,837 B2 | 5/2013 | Devanneaux et al. |
| 8,566,867 B1 | 10/2013 | Yang et al. |
| 8,601,052 B2 | 12/2013 | Mir et al. |
| 8,625,667 B2 | 1/2014 | Cilli et al. |
| 8,635,339 B2 | 1/2014 | Luna |
| 8,655,404 B1 | 2/2014 | Singh et al. |

(Continued)

FOREIGN PATENT DOCUMENTS

| | | |
|---|---|---|
| WO | 2016063161 A1 | 4/2016 |

OTHER PUBLICATIONS

Yan et al., "Fast App Launching for Mobile Devices Using Predictive User Context", MobiSys 12, 14 pages, Jun. 25-29, 2012.

(Continued)

*Primary Examiner* — James E Springer
(74) *Attorney, Agent, or Firm* — D. Kligler IP Services Ltd.

(57) ABSTRACT

A method includes sending to a user device prefetch notifications, which notify the user device of available prefetch updates. Requests are received from the user device for one or more first prefetch updates, selected by the user device in response to the prefetch notifications. Selected prefetch updates are delivered to the user device, including both (i) one or more of the requested first prefetch updates, and (ii) one or more second prefetch updates selected from among the available prefetch updates not in response to any request from the user device.

35 Claims, 2 Drawing Sheets

(56) References Cited

U.S. PATENT DOCUMENTS

| | | | |
|---|---|---|---|
| 8,732,237 B2* | 5/2014 | Li | G06F 17/3089 709/203 |
| 8,762,456 B1 | 6/2014 | Chan et al. | |
| 8,826,102 B2 | 9/2014 | Liu et al. | |
| 8,849,731 B2 | 9/2014 | Lymberopoulos et al. | |
| 8,886,176 B2 | 11/2014 | Luna et al. | |
| 8,943,197 B1* | 1/2015 | Taylor | G06F 17/2247 709/224 |
| 8,949,420 B2 | 2/2015 | Banavar et al. | |
| 9,009,103 B2 | 4/2015 | Rangarajan et al. | |
| 9,043,433 B2 | 5/2015 | Backholm | |
| 9,049,179 B2 | 6/2015 | Luna | |
| 9,111,309 B2 | 8/2015 | Howard et al. | |
| 9,118,623 B2 | 8/2015 | Devanneaux et al. | |
| 9,208,123 B2 | 12/2015 | Luna | |
| 9,247,019 B2 | 1/2016 | Luna et al. | |
| 9,256,484 B2 | 2/2016 | Stanley-Marbell et al. | |
| 9,307,007 B2 | 4/2016 | Kapadia et al. | |
| 9,392,393 B2 | 7/2016 | Wood et al. | |
| 9,407,713 B2 | 8/2016 | Luna et al. | |
| 2002/0198991 A1 | 12/2002 | Gopalakrishnan et al. | |
| 2003/0101234 A1* | 5/2003 | McBrearty | G06F 17/30902 709/218 |
| 2003/0126232 A1 | 7/2003 | Mogul et al. | |
| 2003/0187984 A1* | 10/2003 | Banavar | H04L 29/06 709/225 |
| 2003/0195940 A1 | 10/2003 | Basu et al. | |
| 2005/0154781 A1* | 7/2005 | Carlson | G06F 17/30902 709/203 |
| 2005/0198191 A1 | 9/2005 | Carlson et al. | |
| 2006/0056336 A1 | 3/2006 | Dacosta | |
| 2006/0277308 A1 | 12/2006 | Morse et al. | |
| 2007/0067698 A1 | 3/2007 | King et al. | |
| 2008/0229025 A1 | 9/2008 | Plamondon | |
| 2008/0253693 A1 | 10/2008 | Chu et al. | |
| 2008/0301300 A1* | 12/2008 | Toub | G06F 17/30902 709/227 |
| 2009/0077261 A1* | 3/2009 | Broadhurst | H04L 63/12 709/246 |
| 2009/0157811 A1* | 6/2009 | Bailor | G06F 17/30168 709/204 |
| 2009/0292819 A1 | 11/2009 | Kandekar et al. | |
| 2010/0088369 A1 | 4/2010 | Sebastian et al. | |
| 2010/0161831 A1* | 6/2010 | Haas | G06F 15/173 709/235 |
| 2010/0161906 A1 | 6/2010 | Bolger et al. | |
| 2011/0029670 A1 | 2/2011 | Klein et al. | |
| 2012/0023226 A1 | 1/2012 | Petersen et al. | |
| 2012/0072671 A1 | 3/2012 | Chirca et al. | |
| 2012/0289147 A1 | 11/2012 | Raleigh et al. | |
| 2013/0019159 A1* | 1/2013 | Civelli | G06F 17/30902 715/234 |
| 2013/0031204 A1 | 1/2013 | Graham et al. | |
| 2013/0067170 A1 | 3/2013 | Lam | |
| 2013/0263180 A1 | 10/2013 | Yang et al. | |
| 2013/0290557 A1 | 10/2013 | Baratz | |
| 2013/0343450 A1 | 12/2013 | Solka et al. | |
| 2014/0032718 A1 | 1/2014 | Berger et al. | |
| 2014/0059156 A1 | 2/2014 | Freeman, II et al. | |
| 2014/0094163 A1 | 4/2014 | Widdowson et al. | |
| 2014/0095943 A1* | 4/2014 | Kohlenberg | H04L 29/08 714/47.3 |
| 2014/0150019 A1 | 5/2014 | Ma et al. | |
| 2014/0219088 A1 | 8/2014 | Oyman et al. | |
| 2014/0250358 A1* | 9/2014 | Milener | G06F 17/30899 715/207 |
| 2014/0279026 A1 | 9/2014 | Nath et al. | |
| 2014/0283108 A1 | 9/2014 | Torgerson et al. | |
| 2014/0362768 A1 | 12/2014 | Wood et al. | |
| 2014/0364104 A1 | 12/2014 | Wood et al. | |
| 2014/0366041 A1 | 12/2014 | Stanley-Marbell et al. | |
| 2014/0366042 A1 | 12/2014 | Chan et al. | |
| 2014/0372511 A1 | 12/2014 | Kapadia et al. | |
| 2014/0373032 A1 | 12/2014 | Merry et al. | |
| 2014/0379840 A1 | 12/2014 | Dao | |
| 2015/0100664 A1* | 4/2015 | Flack | H04L 67/28 709/213 |
| 2015/0120821 A1 | 4/2015 | Bendell et al. | |
| 2015/0120858 A1* | 4/2015 | Anderson | G06F 17/2247 709/213 |
| 2015/0178337 A1* | 6/2015 | Hellstrom | G06Q 10/10 706/14 |
| 2015/0188959 A1 | 7/2015 | Sayed | |
| 2015/0241941 A1 | 8/2015 | Luna et al. | |
| 2015/0256641 A1 | 9/2015 | Agarwal et al. | |
| 2015/0296505 A1 | 10/2015 | Luna et al. | |
| 2015/0347204 A1 | 12/2015 | Stanley-Marbell et al. | |
| 2015/0347205 A1 | 12/2015 | Stanley-Marbell et al. | |
| 2015/0347907 A1 | 12/2015 | Mathew et al. | |
| 2015/0347908 A1 | 12/2015 | Mathew et al. | |
| 2015/0350807 A1 | 12/2015 | Andrews et al. | |
| 2015/0350885 A1 | 12/2015 | Stanley-Marbell et al. | |
| 2015/0351033 A1 | 12/2015 | Stanley-Marbell et al. | |
| 2015/0355893 A1 | 12/2015 | Luk et al. | |
| 2015/0365904 A1 | 12/2015 | Luna et al. | |
| 2015/0371142 A1 | 12/2015 | Jain | |
| 2016/0004410 A1* | 1/2016 | Srinivasan | G06Q 50/01 715/765 |
| 2016/0021211 A1 | 1/2016 | Yellin et al. | |
| 2016/0063577 A1 | 3/2016 | Yellin et al. | |
| 2016/0065662 A1 | 3/2016 | Yellin et al. | |
| 2016/0191651 A1 | 6/2016 | Balakrishnan et al. | |
| 2016/0191664 A1 | 6/2016 | Balakrishnan et al. | |
| 2016/0205028 A1 | 7/2016 | Luna et al. | |
| 2017/0126833 A1 | 5/2017 | Deluca | |

OTHER PUBLICATIONS

Andtaus et al., "File Prefetching for Mobile Devices Using On-Line Learning", 10 pages, Aug. 2008.
International Application # PCT/IB015/057698 Search Report dated Feb. 11, 2016.
Apple Inc., "Example Playlist Files for use with HTTP Live Streaming", iOS Developer Library, Technical Note TN2288, 16 pages, May 9, 2012.
Apple Inc., "HTTP Live Streaming Overview—Introduction", Mac Developer Library, 3 pages, Feb. 11, 2014.
Pantos et al., "HTTP Live Streaming draft-pantos-http-live-streaming-13", Internet-Draft, 56 pages, Apr. 16, 2014.
Higgins et al., "Informed Mobile Prefetching", MobiSys'12, 14 pages, Jun. 25-29, 2012.
Yellin et al U.S. Appl. No. 15/285,503, filed Oct. 5, 2016.
U.S. Appl. No. 14/691,597 Office Action dated Jul. 5, 2017.
European Application # 15821969.1 search report dated Dec. 13, 2017.
International Application # PCT/IB2017/055646 partial search report dated Jan. 21, 2018.

\* cited by examiner

EFFICIENT PRE-FETCHING NOTIFICATIONS

CROSS-REFERENCE TO RELATED APPLICATIONS

This application is a continuation-in-part of U.S. patent application Ser. No. 14/691,597. This application also claims the benefit of U.S. Provisional Patent Application 62/279,773, filed Jan. 17, 2016, and U.S. Provisional Patent Application 62/287,918, filed Jan. 28, 2016. The disclosures of all these related applications are incorporated herein by reference.

FIELD OF THE INVENTION

The present invention relates generally to communication system, and particularly to methods and systems for prefetching content to user devices in communication networks.

BACKGROUND OF THE INVENTION

Various techniques are known in the art for delivering content to wireless users. For example, U.S. Pat. No. 8,601,052, whose disclosure is incorporated herein by reference, describes a method and system for performing content prefetching for a wireless portable computing device (PCD).

As another example, U.S. Patent Application Publication 2010/0161831, whose disclosure is incorporated herein by reference, describes a content and traffic managing system. A mobile device is connectable to users and to content providers via communication links. The system tracks various parameters over time, and schedules communication in relation to predefined or projected content responsive to user content-related behavior, user communication behavior, user external behavior, and parameters of communication links.

SUMMARY OF THE INVENTION

An embodiment of the present invention that is described herein provides a method including sending to a user device prefetch notifications, which notify the user device of available prefetch updates. Requests are received from the user device for one or more first prefetch updates, selected by the user device in response to the prefetch notifications. Selected prefetch updates are delivered to the user device, including both (i) one or more of the requested first prefetch updates, and (ii) one or more second prefetch updates selected from among the available prefetch updates not in response to any request from the user device.

In some embodiments, at least some of the selected prefetch updates includes content items that are available for prefetching. Additionally or alternatively, at least some of the selected prefetch updates include updates to a prefetch policy.

In an embodiment, delivering the selected prefetch updates includes embedding at least a portion of the selected prefetch updates in one or more of the prefetch notifications sent to the user device. In another embodiment, delivering the selected prefetch updates includes embedding a differential update of at least one of the selected prefetch updates in one or more of the prefetch notifications sent to the user device. In yet another embodiment, delivering the selected prefetch updates includes compressing a selected prefetch update, and embedding the compressed prefetch update in one of the prefetch notifications sent to the user device.

In a disclosed embodiment, delivering the selected prefetch updates includes embedding multiple portions of a content item in a plurality of the prefetch notifications sent to the user device. In an example embodiment, delivering the selected prefetch updates includes evaluating a predefined criterion that decides whether or not to restrict the selected prefetch updates to be chosen only from among the first prefetch updates. In an embodiment, delivering the selected prefetch updates includes evaluating the predefined criterion based on one or more of: a time-of-day; a quality of a network connection with the user device; a type of the network connection; a cost of transferring data to the user device; an estimated likelihood that the selected prefetch update will be requested by a user of the user device; a battery level of the user device; an indicator signaled from the user device; and a currently applied prefetching mode.

In some embodiments, delivering the selected prefetch updates includes evaluating a predefined criterion that decides whether or not to embed a selected prefetch update in the prefetch notifications. Evaluating the predefined criterion may include verifying whether a size of the selected prefetch update fits an available space in one or more prefetch notifications that are to be sent to the user device.

In some embodiments, delivering a prefetch update for an item includes (i) delivering to the user device a difference between an updated version of the item and a previous version of the item that is already available in the user device, and sending to the user device a first signature calculated over the updated version, and (ii) in the user device, reconstructing the updated version based on the previous version and the difference, calculating a second signature over the reconstructed updated version, and verifying the reconstructed updated version by comparing the first and second signatures.

In some embodiments, delivering a prefetch update for an item includes sending to the user device a sequence of differential prefetch updates, and, in response to the user device detecting an error in at least one of the differential prefetch updates, resending one or more of the differential prefetch updates or resending the prefetch update non-differentially. In an example embodiment, sending the sequence includes sending the differential prefetch updates with corresponding version numbers, and detecting the error includes detecting a discrepancy in the version numbers.

In an embodiment, the method further includes detecting in the user device an error in a received prefetch update for an item, by reconstructing the item from the received prefetch update, and detecting a deviation from an expected structure of the item. In a disclosed embodiment, delivering the prefetch updates includes delivering the second prefetch updates only by embedding the second prefetch updates in the prefetch notifications. In another embodiment, delivering the prefetch updates includes delivering in the second prefetch updates only prefetch policy updates and not content updates.

There is additionally provided, in accordance with an embodiment of the present invention, an apparatus including an interface and one or more processors. The interface is configured to communicate over a network. The one or more processors are configured to send to a user device over the network prefetch notifications, which notify the user device of available prefetch updates, to receive from the user device over the network requests for one or more first prefetch updates, selected by the user device in response to the prefetch notifications, and to deliver to the user device over the network selected prefetch updates, which include both (i) one or more of the requested first prefetch updates, and (ii)

one or more second prefetch updates selected from among the available prefetch updates not in response to any request from the user device.

There is further provided, in accordance with an embodiment of the present invention, a computer software product, the product including a tangible non-transitory computer-readable medium in which program instructions are stored, which instructions, when read by one or more processors, causes the one or more processors to send to a user device over a network prefetch notifications, which notify the user device of available prefetch updates, to receive from the user device over the network requests for one or more first prefetch updates, selected by the user device in response to the prefetch notifications, and to deliver to the user device over the network selected prefetch updates, which include both (i) one or more of the requested first prefetch updates, and (ii) one or more second prefetch updates selected from among the available prefetch updates not in response to any request from the user device.

The present invention will be more fully understood from the following detailed description of the embodiments thereof, taken together with the drawings in which:

DETAILED DESCRIPTION OF EMBODIMENTS

Overview

Figure 1:
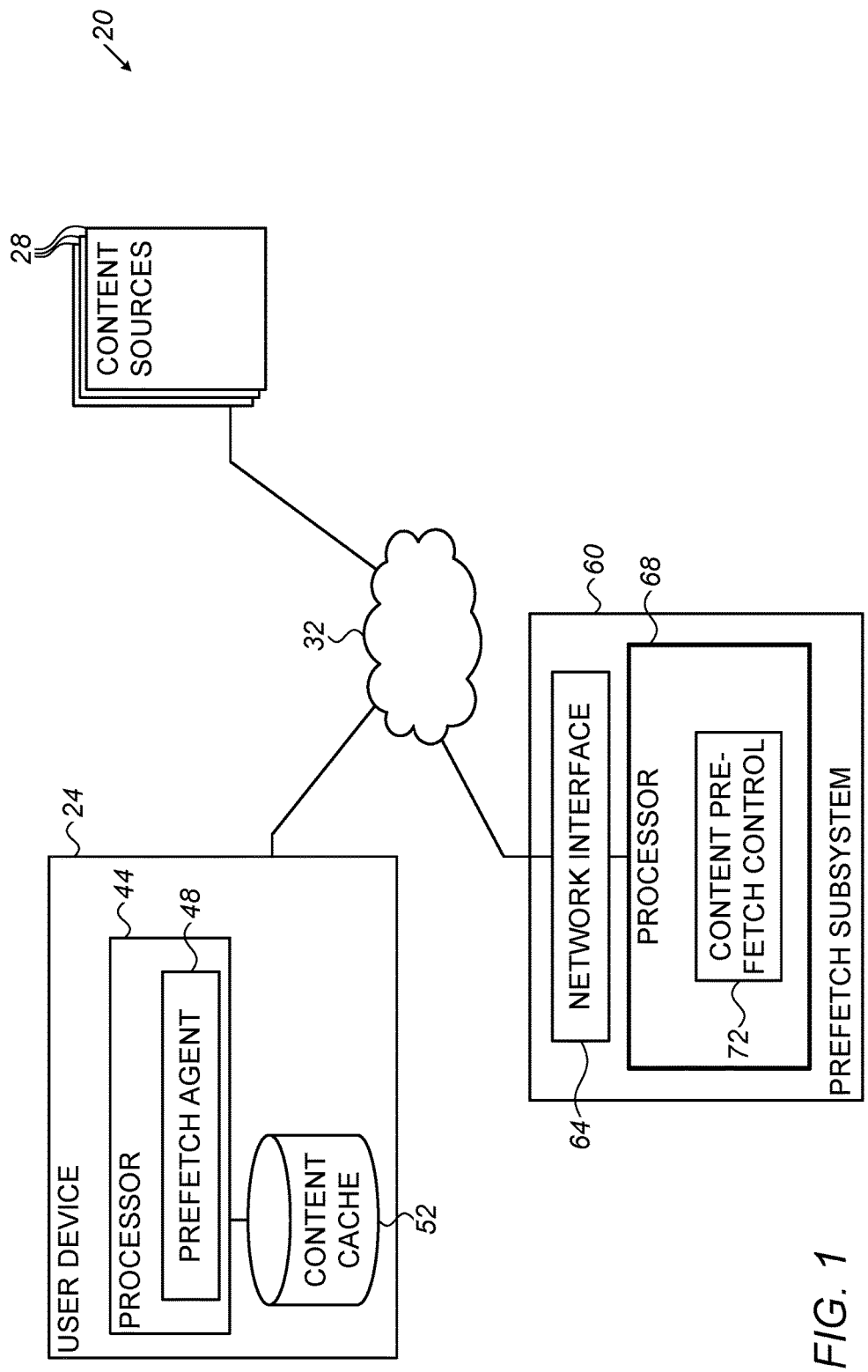
FIG. 1 is a block diagram that schematically illustrates a content delivery system, in accordance with an embodiment of the present invention.

Embodiments of the present invention that are described herein provide improved methods and systems for prefetching content to user devices. In some disclosed embodiments, a processor in a content delivery system runs a Content Prefetch Control unit (CPC). The CPC prefetches content items from one or more content sources over a network to the user devices, in accordance with a specified prefetch policy.

Among other tasks, the CPC generates and sends to the user devices Prefetch Notifications (PNs) that notify the user devices of prefetch updates. Prefetch updates may comprise, for example, updates to content items and/or updates to the prefetch policy.

A user device may request the CPC to deliver selected prefetch updates, relating to content items and/to the prefetch policy, in response to the PNs. Such prefetch updates are referred to herein as "requested updates." In addition, the CPC may decide to deliver to a user device prefetch updates, relating to content items and/to the prefetch policy, even though they were not requested by the user device. Such prefetch updates are referred to herein as "non-requested updates."

The two types of prefetch updates (requested and non-requested) can be viewed as two layers of prefetching that are employed concurrently, nicknamed "prefetching" and "pre-prefetching". Thus, a user device may cache both (i) content items that were not requested by the user, but were requested to be prefetched by the user device, and (ii) content items that were not requested by the user or by the user device, but were nevertheless prefetched to the user device by the CPC. A similar two-layer hierarchy can be used for prefetch policy updates, as well. In the present context, the terms "content item" and "prefetch policy" also refer to updates to previously-prefetched versions of content items or of a prefetching policy, or to updates for content items that were previously fetched (e.g., in real-time, not prefetched) and are still in the user device cache.

By delivering both requested and non-requested prefetch updates, the CPC is able to combine the information available on the user-device side and on the network side, e.g., as to the relevance of updates and the likelihood that updates will be requested by the user. As a result, the average content access latency is reduced and user experience is enhanced.

In some embodiments, the CPC embeds at least some of the prefetch updates (requested and/or non-requested, relating to content items and/to prefetch policy) in the PNs that are sent to the user devices. Embedding content and/or prefetch policy in the PNs is highly efficient and does not exist in prior-art schemes. Additionally or alternatively, the CPC may send at least some of the prefetch updates (requested and/or non-requested, relating to content items and/or prefetch policy) separately from the PNs.

Several example techniques for embedding prefetch updates in PNs, several example criteria for deciding whether to embed prefetch updates, and several example operational modes that utilize these features, are described herein. Embedding prefetch updates in PNs reduces communication overhead, and thus reduces power consumption in the user device and congestion in the network. The load on the CPC may be reduced, as well.

System Description

FIG. 1 is a block diagram that schematically illustrates a content delivery system 20, in accordance with an embodiment of the present invention. The configuration of system 20 is one example configuration. Several alternative configurations are described further below.

System 20 comprises a user device 24 that accesses and consumes content items provided by one or more content sources 28 over a network 32. Device 24 may comprise any suitable wireless or wireline device, such as, for example, a cellular phone or smartphone, a wireless-enabled laptop or tablet computer, a desktop personal computer, or any other suitable type of user device that is capable of communicating over a network and presenting content to a user. User device 24 may consume content using any suitable software, e.g., a browser or dedicated application. The figure shows a single user device 24 for the sake of clarity. Real-life systems typically comprise a large number of user devices of various kinds.

Network 32 may comprise, for example a Wide Area Network (WAN) such as the Internet, a Local Area Network (LAN), a wireless network such as a cellular network or Wireless LAN (WLAN), or any other suitable network or combination of networks.

Content sources 28 may comprise, for example, Web content servers, or any other suitable sources of content. The description that follows refers mainly to delivery of Web pages. The disclosed techniques, however, can be used with any other suitable types of content items, such as, for example, audio or video clips, html files, java scripts and/or CSS files, to name just a few examples.

In some embodiments, system 20 performs prefetching of content items to user device 24. In the present example, user device 24 comprises a processor 44 that carries out the various processing tasks of the user device. Among other tasks, processor 44 runs a software component referred to as a prefetch agent 48, which handles prefetching of content items. In addition, user device 24 comprises a content cache 52 for caching prefetched content items. Cache 52 is typically managed by prefetch agent 48.

Typically, prefetch agent 48 receives prefetched content items and stores them in content cache 52. Prefetch agent 48 may intercept user requests to access content items, and determine whether a requested item already resides in the cache. If so, the prefetch agent may retrieve the requested content item from the content cache. Otherwise, the prefetch agent would typically retrieve the requested content item from content sources 28 over network 32. In an embodiment, prefetch agent 48 may also assist in tracking historical usage patterns, and other relevant data related to the user device, which can be used as inputs for specifying prefetch policies for content.

User device 24 typically also comprises a suitable network interface (not shown in the figure) for connecting to network 32. This network interface may be wired (e.g., an Ethernet Network Interface Controller—NIC) or wireless (e.g., a cellular modem or a Wi-Fi modem). Typically, user device 24 further comprises some internal memory (not shown in the figure) that is used for storing relevant information, such as the applicable prefetch policy.

In the embodiment of FIG. 1, system 20 further comprises a prefetching subsystem 60 that performs the various content prefetching tasks on the network side. Subsystem 60 comprises a network interface 64 for communicating over network 32, and a processor 68 that carries out the various processing tasks of the prefetching subsystem. In the present example, processor 68 runs a Content Prefetching Control unit (CPC) 72 that carries out content prefetching.

In an example embodiment, CPC 72 defines and enforces a prefetch policy, which specifies how content is to be prefetched to user device 24. For example, CPC 72 may determine which content items are to be prefetched from content sources 28 to content cache 52, e.g., based on the likelihood that the user will request the content items. The CPC may determine the appropriate time for prefetching content items, e.g., based on a prediction of the time the user is expected to request them, and/or availability of communication resources. The CPC may determine how content items are to be delivered to cache 52, e.g., over a Wi-Fi or cellular connection. As yet another example, the CPC may determine the format with which content items are to be delivered to the user device, e.g., whether and how to perform compression or to deliver only changes for the case of content already prefetched (i.e., differential prefetch updates).

In various embodiments, as part of applying the prefetch policy, CPC 72 may estimate, for each content item, the likelihood that the user of user device 24 will request access to the content item within a certain upcoming period of time. Such likelihood metrics can be sent to user device 24, and may be used by prefetch agent 48 in ranking prefetch priorities for the different content items. The likelihood estimation in CPC 72 may take into account various factors. Some factors may be user-related (e.g., gender, geographical location, interests, and/or recent and historical Internet activity). Other factors may be environment-related (e.g., time-of-day, road traffic conditions, weather, current events, and/or sporting occasions). Yet other factors may be content-related (e.g., content topic or category, content keywords, identity of the content source, and/or the current popularity or rating of the content).

Additionally or alternatively to the likelihood of the user accessing the content, other factors that CPC 72 may consider in specifying the prefetch policy may comprise power consumption considerations (e.g., preference to prefetch while a Wi-Fi connection or a strong cellular connection is available), transmission cost considerations (e.g., preference to lower-cost data transfer times), network congestion and server load considerations (e.g., preference to prefetch during off-peak traffic hours), and/or other user-related or network-related considerations.

Further additionally or alternatively, in specifying the prefetch policy, CPC 72 may associate certain times-of-day with respective prefetch priority levels. This association may be performed separately for different apps or content sources, or jointly for multiple apps or content sources. One example factor in determining the prefetch priority levels is the estimated likelihood of the user accessing the different apps or content sources during various times-of-day. Assigning a high priority to a prefetch operation typically translates to the prefetch operation being likely to occur (possibly conditioned on certain constraints or limitations).

Certain aspects of content prefetching, and content prefetching schemes that can be used by subsystem 60 and agent 48, are addressed in U.S. Patent Application Publication 2016/0021211, which is assigned to the assignee of the present patent application and whose disclosure is incorporated herein by reference. For example, CPC 72 may choose between various prefetching modes, e.g., a guaranteed prefetching mode and a best-effort prefetching mode. In the guaranteed prefetching mode, CPC 72 continuously tracks changes in content on content sources 28 (e.g., at predefined tracking intervals) and ensures that content cache 52 in user device 24 is regularly updated by prefetching to be synchronized with the content sources (e.g., at predefined guaranteed-mode prefetching intervals). In the best-effort mode, the CPC typically performs prefetching only as feasible using the available resources. For example, in the best-effort mode, prefetching may be restricted to scenarios in which a particularly robust network connection exists, or limited to scenarios that do not involve a cellular connection. The guaranteed prefetching mode may be utilized during one or more time-of-day intervals in which the likelihood of a user accessing a content source has been predicted to be high. Other considerations that can affect the choice between the guaranteed and best-effort modes can be based on various prefetching policy considerations, e.g., power consumption, transmission cost, network congestion and/or server load. The choice of mode can also be made separately for different applications and/or content sources.

In some embodiments, CPC 72 regularly monitors content sources 28 and generates a "prefetch catalog"—a catalog of content items available for prefetching. Each content item is represented in the catalog by an identifier (ID) and a version number indication. The version numbers enable CPC 72 and/or prefetch agent 48 to determine, for example, whether a certain content item has changed relative to the version cached in cache 52 of user device 24. The catalog may also comprise the likelihood metrics described above, links or addresses from which the content items can be retrieved, and/or any other relevant information. The catalog is considered part of the prefetch policy, along with any other prefetch rules, strategies, thresholds or other policy matters defined by CPC 72.

In some embodiments, CPC 72 generates and sends to user device 24 Prefetch Notifications (PNs) that notify prefetch agent 48 in user device 24 of available updates to content items and/or to the prefetch policy. A PN may be generated and sent to a certain user device, for example, if the CPC determines that an identified content or policy update is significant for that particular user. The CPC may send PNs to user devices using any suitable protocol or notification scheme. Example schemes comprise Google Cloud Messaging (GCM) and Firebase Cloud Messaging (FCM) used for Android devices, and Apple Push Notification (APN) used for iOS devices. Example structures of PNs and example processes of generating them are described in detail below.

The configurations of system 20 and its various elements shown in FIG. 1 are example configurations, which are chosen purely for the sake of conceptual clarity. In alternative embodiments, any other suitable configurations can be used. For example, the functions of prefetching subsystem 60 can be implemented using any desired number of processors, or even in a single processor. The various functions of subsystem 60 can be partitioned among the processors in any suitable way. In another embodiment, some or all of the functions of subsystem 60 may be performed by agent 48 in user device 24.

As another example, prefetch agent 48 may be implemented in a software module running on processor 44, in an application running on processor 44, in a Software Development Kit (SDK) embedded in an application running on processor 44, by the Operating System (OS) running on processor 44, or in any other suitable manner. In an embodiment, processor 44 may run a proxy server, which is controlled by prefetch agent 48 and is exposed to incoming and outgoing traffic. Further alternatively, the functionality of prefetch agent 48 can be implemented entirely on the network side without an agent on user device 24.

Generally, the functions of the different systems elements described herein (e.g., prefetch agent, content sources and elements of subsystem 60) can be partitioned in any other suitable way. Thus, in the context of the present patent application and in the claims, the disclosed techniques are carried out by one or more processors. The processors may reside in user device 24, and/or on the network side such as in subsystem 60 and/or in content sources 28.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, agent 48 and/or subsystem 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Delivery of Prefetch Updates by Embedding in Prefetch Notifications

As noted above, in some embodiments CPC 72 generates and sends Prefetch Notifications (PNs) to prefetch agent 48 of user device 24. The PNs notify the user device of available prefetch updates. In the present context, the term "prefetch update" refers to an update for one or more content items (including new available content items) and/or an update to the prefetch policy.

Prefetch agent 48 may send to CPC 72 requests to deliver selected prefetch updates (relating to content items and/to the prefetch policy) in response to the PNs. Such prefetch updates, which are delivered upon request from the user device, are referred to herein as "requested updates." In addition, the CPC may decide to deliver to the user device prefetch updates (relating to content items and/to the prefetch policy) even though the prefetch agent did not request them. Such prefetch updates are referred to herein as "non-requested updates."

In some embodiments, CPC 72 supports several modes of delivering non-requested prefetch updates to user device 24. In an example embodiment, the CPC supports two "prefetch update modes" and two "prefetch transmit modes" defined as follows:

Prefetch update modes:
1. "Request-based mode"—A prefetch update is sent only in response to a request for update from user device 24.
2. "Unrestricted mode"—Prefetch updates may be sent in response to requests for update from the user devices. However, the system is permitted to send prefetch updates (subject to certain conditions) not in response to requests from the user devices.

Prefetch transmit modes:
1. "PN mode"—The CPC embeds prefetch updates in PNs that are sent to the user devices.
2. "Standalone mode"—The CPC sends prefetch updates separately from the PNs.

When using the PN mode, in some cases the CPC may embed a given prefetch update in a PN that pertains to the same given prefetch update. This relationship, however, is not mandatory. In some cases the CPC may use available space in a certain PN to embed a prefetch update that is unrelated to the update notified by the PN. For example, the CPC may embed a (requested or non-requested) prefetch update that was notified by some previous PN.

In various embodiments, system 20 may apply various combinations of the prefetch update mode and the prefetch transmit mode at a given time. For example, in some embodiments the CPC applies the PN mode together with the unrestricted mode (i.e., embed both requested and non-requested prefetch updates in PNs).

In other embodiments, the CPC may apply the PN mode together with the request-based mode. Consider, for example, a scenario in which the CPC sends a new PN pertaining to a newly available prefetch update, and at approximately the same time has to respond to a previous update request from the user device (typically in response to some previous PN). In such a case, the CPC may decide to embed some or all of the requested content update in the new PN.

In other embodiments, the CPC may apply the standalone mode together with the unrestricted mode. Consider, for example, a scenario in which the CPC operates in the unrestricted mode and intends to deliver a non-requested prefetch update to the user device. In such a case, if the prefetch update in question is too large to fit in a PN, the CPC may decide to send the prefetch update to the user device in the standalone mode.

Typically, prefetch updates are free to comprise both prefetch policy updates (which may not necessarily involve content updates, e.g., changes in likelihood metrics) and content updates (pertaining to new or updated content items). In some embodiments, however, some restrictions may be imposed. For example, the CPC may be permitted to apply the unrestricted mode (i.e., permitted to deliver both requested and non-requested updates) only for prefetch policy updates, not for content updates. As another example, the CPC may be permitted to apply the PN mode (i.e., embedding updates in PNs) only for prefetch policy updates, not for content updates.

CPC 72 may use various criteria or heuristics for selecting the appropriate prefetch update mode (request-based or unrestricted) and the appropriate prefetch transmit mode (PN or standalone). Several examples are depicted further below.

Figure 2:
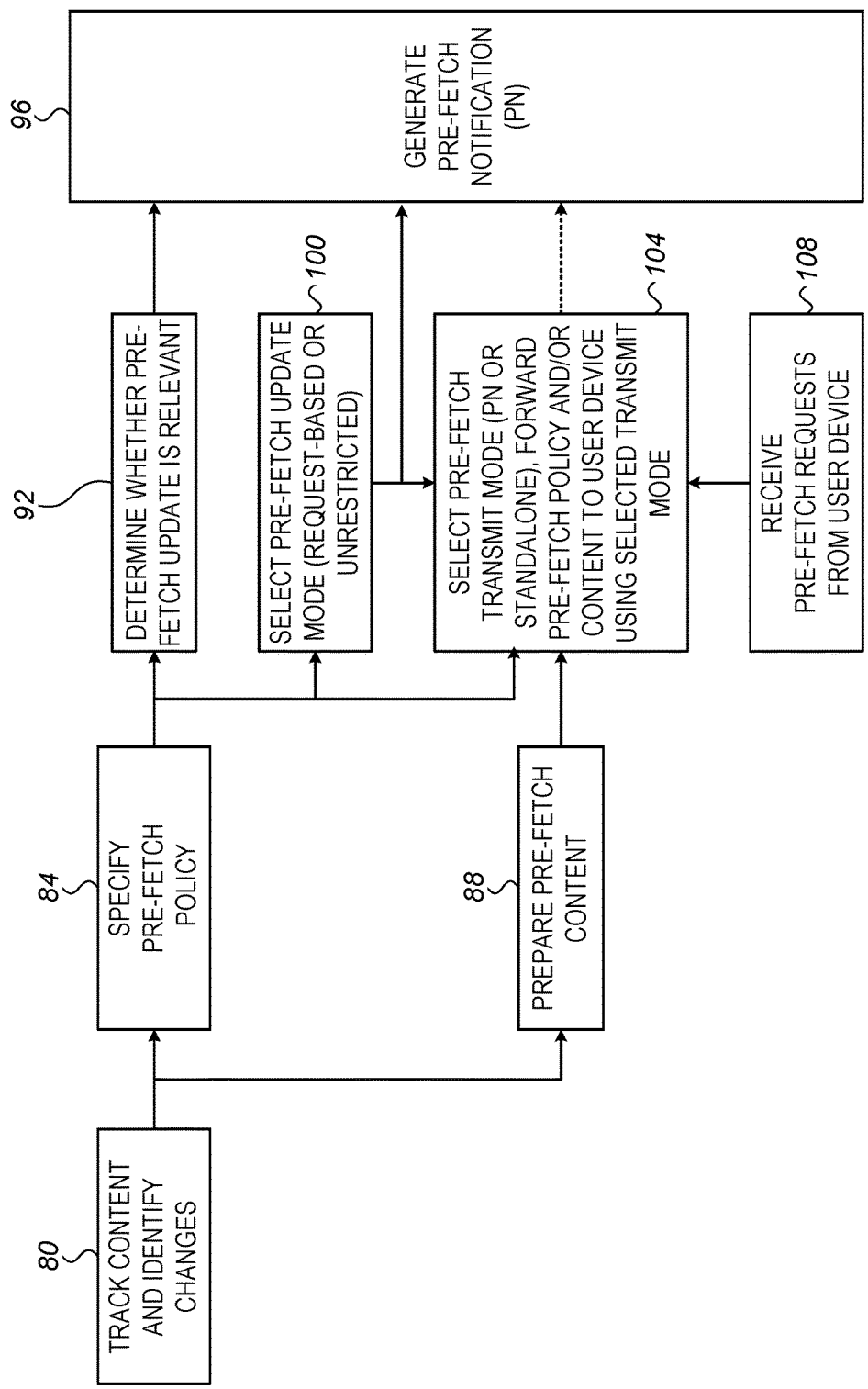
FIG. 2 is a flow chart that schematically illustrates a method for generating prefetch notifications, in accordance with an embodiment of the present invention.

FIG. 2 is a flow chart that schematically illustrates a method for generating PNs, in accordance with an embodiment of the present invention. The method begins with CPC 72 tracking the content on one or more of content sources 28 and identifying changes in content items, at a content tracking step 80.

At a policy specification step 84, CPC 72 creates or updates the prefetch policy. As noted above, the prefetch catalog is considered part of the prefetch policy. At a prefetch preparation step 88, CPC 72 prepares content, which was identified as changed, for possible prefetching to user device 24.

At a relevance verification step 92, CPC 72 checks whether, in accordance with the prefetch policy, a certain prefetch update is relevant to the particular user. If so, the CPC generates and sends to user device 24 a PN, which notifies the user device of the prefetch update, at a PN generation step 96.

At a prefetch update mode selection step 100, CPC 72 decides whether to select the request-based mode or the unrestricted mode. At a prefetch transmit mode selection step 104, CPC 72 decides whether to select the PN mode or the standalone mode, and then delivers the prefetch update using the selected prefetch transmit mode. In a typical embodiment, the selection between the PN mode and the standalone mode is made based on the size of the prefetch update (e.g., whether the prefetch update fits in a PN or not).

At a request reception step 108, CPC 72 receives requests from user device 24 to deliver selected prefetch updates. The requests are generated by prefetch agent 48 in user device 24, in response to previously received PNs. The CPC responds to the requests by forwarding the requested prefetch updates to the user device, at step 104.

In some cases, a single PN does not have sufficient spare data size to fit an entire prefetch update, e.g., an entire updated content item. In such cases, CPC 72 may divide a prefetch update, e.g., a content item, into multiple chunks, and embed each chunk in a different respective PN. This technique is useful, for example, for sending large content items such as images using the PN mode.

In an embodiment, CPC 72 embeds all non-requested prefetch updates in PNs that are sent anyway to the user device. In order to operate in this manner, two conditions should be met:

Conditions should be suitable for the CPC to be sending PNs to the user device. For example, channel and network conditions should be sufficiently good for sending PNs, or the CPC may operate in a guaranteed prefetching mode (or in a best-effort prefetching mode while resources are available).

The prefetch updates should be of a size that fits in the PNs. In some cases this condition might require that an update fit in a single PN. In other cases, this condition might be relaxed to permit sending larger non-requested updates over multiple PNs.

In some embodiments, the disclosed techniques can be applied not only to user content, but to any other suitable content, for example to advertisements ("ads"). Thus, in the present context, advertisements prefetched to the user device are also regarded as content items. Certain aspects of ad prefetching are addressed, for example, in U.S. Patent Application Publication 2016/0063577, which is assigned to the assignee of the present patent application and whose disclosure is incorporated herein by reference.

Selection Between Prefetch Update Modes and Prefetch Transmit Modes

CPC 72 may evaluate various criteria for deciding (i) whether to allow both requested and non-requested prefetch updates or only requested prefetch updates, and (ii) whether to deliver prefetch updates using the PN mode (i.e., to embed prefetch updates in PNs) or using the standalone mode (i.e., not to embed). The selection criteria may depend on various factors, many of which vary over time.

For example, CPC 72 may choose between the PN mode and the standalone mode depending on the data size of the prefetch update in question. If the prefetch update is relatively small, e.g., fits the available data size in the PNs, in accordance with the protocol used for sending the PNs (e.g., GCM or APN), the CPC may decide to use the PN mode. Otherwise, if the prefetch update is relatively large, e.g., does not fit into the available data size in the PNs, the CPC may decide to use the standalone mode. The size of the prefetch update is typically a key factor in deciding whether to select the PN mode or the standalone mode. If a prefetch update (policy update and/or content item update) is sufficiently small to fit in a PN (that is possibly being sent anyway), the CPC will most likely take advantage of the PN transmit mode for delivering this update.

In some embodiments, the CPC considers whether it is cost-effective to use the unrestricted mode (i.e., allow sending non-requested prefetch updates) when transfer conditions are unfavorable. For example, there is little benefit in sending a non-requested policy update, if transfer conditions will most likely prevent the user device from acting on the updated policy (e.g., from requesting prefetch). As another example, if the CPC is aware that transfer conditions are such that the user device is unlikely to request a prefetch update, the CPC should typically refrain from sending the update without request.

In embodiments in which non-requested prefetch updates are only sent embedded in PNs, the same or similar criteria can be used for choosing the prefetch update mode and for choosing the prefetch transmit mode. For example, the CPC may decide to send a non-requested prefetch update only if the update is small enough to fit in a PN, and the transfer conditions are good enough to justify sending PNs to the device anyway.

As another example, CPC 72 may choose whether to send PNs (thus enabling potential use of PN mode) depending on the quality of the network connection with user device 24. If, for example, the user device is currently connected to network 32 via a slow cellular connection, or via a connection having a high error rate and/or poor channel conditions, of if network congestion is experienced, the CPC may decide not to send PNs. If the user device is currently connected to network 32 via a fast Wi-Fi connection, or via a connection having good channel conditions, and no network congestion is present, the CPC may take advantage of the situation and embed prefetch updates in the PNs that are anyway being sent.

As another example, CPC 72 may choose whether to send PNs depending on the cost of transferring data to the user device. If the current transmission cost is high (e.g., transmission during peak hours or while roaming) the CPC may decide not to send PNs (thus precluding the use of PN mode). If the current transmission cost is low (e.g., transmission during off-peak hours or via a free Wi-Fi connection) where PNs are being sent anyway the CPC may prefer the PN mode.

Additionally or alternatively, CPC 72 may choose to send a non-requested update in the PN mode depending on the estimated likelihood that the user will request the update in a certain upcoming time period. If the user is highly likely to request the update, the CPC may prefer to send a non-requested update using the PN mode. If the user is not that likely to request the update, the CPC may prefer to wait for a request from the user before transmitting the prefetch update.

Further additionally or alternatively, CPC 72 may choose whether to send a non-requested prefetch update (either in the PN mode or in the standalone mode) depending on the time-of-day. For example, the time-of-day may be correlative with the cost of transmission, with the network quality (e.g., due to the user location at different times-of-day), with the user's content access preferences, or with various other factors that affect the choice between the request-based and unrestricted update modes, and the PN and standalone transmit modes.

In some embodiments, CPC 72 may choose between the PN mode and the standalone mode depending on whether the time-of-day has been assigned a high priority prefetch level. Additionally or alternatively, the choice may depend on the currently applicable prefetch mode. For example, the CPC may choose the standalone mode by default, unless the current prefetch mode is a "guaranteed prefetching mode" and not a "best-effort mode," as discussed in detail in U.S. Patent Application Publication 2016/0021211, cited above.

In some embodiments, the decision between the PN mode and the standalone mode is linked to the decision on whether to send any PN at all to the user device. Once the CPC has decided to send a PN, in some cases it may be cost-effective and desirable to always fill the available PN data space with prefetch updates.

As yet another example, the CPC may choose whether to send a non-requested update and/or whether to send PNs depending on the battery level of user device 24. Typically, when the battery is low, the CPC may prefer not to send non-requested updates and/or not to send PNs in order to reduce power consumption, and vice versa. In such embodiments, prefetch agent 48 may update CPC 72 with the current battery level of user device 24, so as to enable CPC 72 to consider this factor in its mode selection decision.

Additionally or alternatively, CPC 72 may choose whether to send a non-requested update and/or whether to send PNs based on other parameters that are part of the user device state, or are otherwise available in user device 24. Prefetch agent 48 would typically send these parameter values to the CPC.

In other embodiments, prefetch agent 48 sends to CPC 72 an indicator that specifies whether it is currently permitted or forbidden to use the unrestricted update mode and/or the PN transmit mode. In an example embodiment, the CPC chooses the request-based update mode along with standalone transmit mode by default, unless an indicator received from the user device indicates that the PN mode is permitted. If permitted, the CPC may decide which mode to use based on any of the criteria described above. The indicator can vary semi-statically or dynamically. For example, agent 48 may send an updated indicator periodically, and/or when the indicator value changes. In some embodiments the indicator may also signal a maximal rate at which it is permitted to send PNs having embedded prefetch updates.

In another example embodiment, the CPC chooses unrestricted update mode by default, and chooses PN mode for whatever prefetch updates fit in the available PNs being transmitted.

The decision criteria listed above are example criteria that were chosen purely for the sake of conceptual clarity. In alternative embodiments, CPC 72 may decide between the different prefetch update and prefetch transmit modes in accordance with any other suitable criterion.

Differential Prefetch Updates

In some embodiments, CPC 72 sends a prefetch update (of a content item or prefetch policy) to user device 24 by sending only differences relative to the previous version (of the content item or prefetch policy) that was provided to the user device. This technique is referred to herein as differential prefetch update. Differential prefetch updating is highly effective in reducing the amount of data transferred to the user device, thereby reducing the user device power consumption and network congestion.

The CPC may send differential prefetch updates either embedded in PNs (i.e., using the PN mode) or separately from the PNs (i.e., using the standalone mode). In fact, differential prefetch updating increases the likelihood of choosing the PN mode, because the amounts of data that need to be transferred are smaller, and thus are more likely to fit in the PN.

When a differential prefetch update is received at user device 24, prefetch agent 48 combines the received differences with the existing previous version of the content item or prefetch policy, to produce a full up-to-date version of the content item or prefetch policy.

One example use-case of differential prefetch updating is the case of news articles that the content source updates incrementally over time. Small incremental updates typically do not warrant prefetching the full article again to the user device, and are thus good candidates for differential prefetch updating. In an example embodiment, the CPC may send a PN notifying that the article has changed, and embed the actual change in the same PN.

One potential hazard of differential prefetch updating is the possibility of error propagation. If an error in a certain version of the content or policy goes unnoticed, subsequent differential prefetch updates will typically not correct it, and the error will persist. This effect does not exist when transferring full prefetch updates.

CPC 72 may apply various measures to avoid error propagation. In one embodiment, even when using differential prefetch updating, the CPC may periodically perform a full prefetch update of the content item or policy in question.

In another embodiment, prefetch agent 48 in the user device may detect the error, and in response request CPC 72 to perform a full prefetch update. CPC 72 and prefetch agent 48 may use various techniques for detecting errors that occur in (differential or full) prefetch updates.

In an example embodiment, when sending a PN that notifies of a change in a certain item (content item or prefetch policy) the CPC calculates a signature over the updated item, and sends the signature to the user device as part of the PN. In addition, the CPC sends a differential prefetch update for this item. In the user device, prefetch agent 48 receives the differential update, and reconstructs the updated item in cache 52 based on the existing previous version and the received differential update. Then, prefetch agent 48 calculates the signature over the reconstructed item, and compares the calculated signature with the signature received in the PN. A mismatch between the calculated signature and the received signature indicates an error, in which case agent 48 requests the CPC to perform a full (non-differential) prefetch update of this item. In another embodiment, the CPC may send a signature that is calculated over only the differential update (and not over the entire item). This technique enables the prefetch agent to at least detect errors in the prefetch update itself. When multiple prefetch updates are embedded in a given PN, the CPC may calculate and send a signature jointly over all the prefetch updates in a given PN, or individually over each update.

In some embodiments, the signatures are sent as part of the prefetch policy update, either in PN mode or standalone mode.

In the embodiments above, CPC 72 and prefetch agent 48 may use any suitable type of signature. One example is an Error Detection Code (EDC) such as a Cyclic Redundancy Check (CRC) code. Another example of a signature is a hash value calculated using a hash function. In yet another example, the size of the full item can also be used as a signature.

In some embodiments, if CPC 72 receives from prefetch agent 48 a request for a prefetch update for an item (content item or prefetch policy), shortly after a differential prefetch update for this item was sent, the CPC may assume that an error has occurred in the prefetch update.

In an embodiment, the CPC may respond to detecting an error in a differential prefetch update by performing a full prefetch update for this item, i.e., resending the entire item. In another embodiment, the CPC may respond by re-attempting the most recent differential prefetch update. If the re-attempt fails, as well, the CPC may revert to a full prefetch update.

In some cases, an entire PN containing a differential prefetch update may be missed by the prefetch agent 48. If the signature is calculated over the full item (content item or prefetch policy), then, when the prefetch agent receives the subsequent PN with the next differential prefetch update, a mismatch will be found between the calculated and received signatures. The mismatch again enables the prefetch agent to detect the problem and request a full prefetch update for the item.

In alternative embodiments, CPC 72 may assign different version numbers to different differential prefetch updates of a certain item (content item or prefetch policy), and send each differential prefetch update together with its version number. Inspecting the version numbers enables prefetch agent 48 to detect that an entire update was missed. In an embodiment, separate version numbers can be used for each content-item update and for prefetch policy updates.

In some communication networks, PNs may arrive at user device 24 out-of-order, i.e., in an order that differs from the order the PNs were sent by CPC 72. Out-of-order PNs may be problematic when the PNs comprise differential prefetch updates. Assigning version numbers to differential prefetch updates enables the prefetch agent to detect and overcome this problem, as well. In an embodiment, upon detecting a gap in the sequence of arriving version numbers, the prefetch agent may wait for a certain period of time, allowing the missing PNs (carrying the missing differential prefetch updates) to arrive.

If the missing PNs do not arrive after this period of time, the prefetch agent may issue a prefetch update request. In the request, the prefetch agent may indicate the last version number that was received before the gap, so that the CPC can decide what content needs to be resent. For example, the CPC may resend only the missing differential update, or send a full differential update starting from the last received version number. Alternatively, the CPC could decide to send a full (non-differential) update of the content item(s) (or prefetch policy) referenced by the missing differential update.

In some embodiments, for a certain item (content item of prefetch policy), CPC 72 may send a differential prefetch update over multiple versions of the item. In these embodiments, the CPC typically indicates the range of version numbers covered by the differential update in the PN. For example, a single PN can deliver to the user device a differential prefetch update from version #85 to version #88 for the prefetch policy, and a differential prefetch update from version #26 to version #30 for a certain content article. The start and end version numbers are thus typically reported in the PN, as well.

The use of version numbers associated with differential prefetch updates also provides some protection against error propagation, and also against various forms of cyber-attacks. For example, if the version numbers associated with the received prefetch policy precede the current policy version held at the user device, then the received update can be discarded (as long as this version number has already been received and/or the current reconstructed content item has already been validated, e.g., through the use of a signature). Similarly, if the version numbers associated with the received policy are much larger than expected, this too can indicate an error and the received update can be discarded.

Typically the prefetch policy has a particular expected structure, e.g., expected field names. In an embodiment, prefetch agent may detect errors or cyber-attacks by detecting deviations from the expected structure in received prefetch updates for the policy. Such updates may be discarded.

Additionally to sending differential prefetch updates, CPC 72 and prefetch agent 48 may use additional compression techniques to further reduce the size of prefetch updates. Compression would also increase the likelihood of the CPC choosing the PN mode over the standalone mode. Alternatively, the CPC and prefetch agent may use compression techniques when sending full (non-differential) prefetch updates.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
sending, to a user device that runs prefetching software, prefetch notifications that notify the user device of prefetch updates, which were chosen by a network-side processor from among available prefetch updates that are available on a content source;
receiving from the user device requests for one or more requested prefetch updates, selected by the prefetching software in the user device in response to the prefetch notifications; and
causing the user device to cache both (i) updates that were requested by the prefetching software but not by a user of the user device, and (ii) updates that were neither requested by the prefetching software nor by the user, by delivering to the user device selected prefetch updates, which comprise both (i) one or more of the requested prefetch updates, and (ii) one or more non-requested prefetch updates that are selected by the network-side processor from among the available prefetch updates not in response to any request from the user device.

2. The method according to claim 1, wherein delivering the selected prefetch updates comprises embedding at least a portion of the selected prefetch updates in one or more of the prefetch notifications sent to the user device.

3. The method according to claim 1, wherein delivering the selected prefetch updates comprises embedding a differential update of at least one of the selected prefetch updates in one or more of the prefetch notifications sent to the user device.

4. The method according to claim 1, wherein delivering the selected prefetch updates comprises compressing a selected prefetch update, and embedding the compressed prefetch update in one of the prefetch notifications sent to the user device.

5. The method according to claim 1, wherein delivering the selected prefetch updates comprises embedding multiple portions of a content item in a plurality of the prefetch notifications sent to the user device.

6. The method according to claim 1, wherein delivering the selected prefetch updates comprises evaluating a predefined criterion that decides whether or not to restrict the selected prefetch updates to be chosen only from among the requested prefetch updates.

7. The method according to claim 6, wherein delivering the selected prefetch updates comprises evaluating the predefined criterion based on one or more of:
a time-of-day;
a quality of a network connection with the user device;
a type of the network connection;
a cost of transferring data to the user device;
an estimated likelihood that the selected prefetch update will be requested by a user of the user device;
a battery level of the user device;
an indicator signaled from the user device;
a currently applied prefetching mode.

8. The method according to claim 1, wherein delivering the selected prefetch updates comprises evaluating a predefined criterion that decides whether or not to embed a selected prefetch update in the prefetch notifications.

9. The method according to claim 8, wherein evaluating the predefined criterion comprises verifying whether a size of the selected prefetch update fits an available space in one or more prefetch notifications that are to be sent to the user device.

10. The method according to claim 1, wherein delivering a prefetch update for an item comprises:
delivering to the user device a difference between an updated version of the item and a previous version of the item that is already available in the user device, and sending to the user device a first signature calculated over the updated version; and
in the user device, reconstructing the updated version based on the previous version and the difference, calculating a second signature over the reconstructed updated version, and verifying the reconstructed updated version by comparing the first and second signatures.

11. The method according to claim 1, wherein delivering a prefetch update for an item comprises sending to the user device a sequence of differential prefetch updates, and, in response to the user device detecting an error in at least one of the differential prefetch updates, resending one or more of the differential prefetch updates or resending the prefetch update non-differentially.

12. The method according to claim 11, wherein sending the sequence comprises sending the differential prefetch updates with corresponding version numbers, and wherein detecting the error comprises detecting a discrepancy in the version numbers.

13. The method according to claim 1, and comprising detecting in the user device an error in a received prefetch update for an item, by reconstructing the item from the received prefetch update, and detecting a deviation from an expected structure of the item.

14. The method according to claim 1, wherein delivering the prefetch updates comprises delivering the non-requested prefetch updates only by embedding the non-requested prefetch updates in the prefetch notifications.

15. The method according to claim 1, wherein delivering the prefetch updates comprises delivering in the non-requested prefetch updates only prefetch policy updates and not content updates.

16. The method according to claim 1, wherein at least some of the selected prefetch updates comprise content items that are available for prefetching.

17. The method according to claim 1, wherein at least some of the selected prefetch updates comprise updates to a prefetch policy.

18. An apparatus, comprising:
an interface, configured to communicate over a network; and
one or more processors, configured to:
send, to a user device that runs prefetching software, over the network, prefetch notifications that notify the user device of prefetch updates, which were chosen by a network-side processor from among available prefetch updates that are available on a content source;
receive from the user device over the network requests for one or more requested prefetch updates, selected by the prefetching software in the user device in response to the prefetch notifications; and
cause the user device to cache both (i) updates that were requested by the prefetching software but not by a user of the user device, and (ii) updates that were neither requested by the prefetching software nor by the user, by delivering to the user device over the network selected prefetch updates, which comprise both (i) one or more of the requested prefetch updates, and (ii) one or more non-requested prefetch updates that are selected by the network-side processor from among the available prefetch updates not in response to any request from the user device.

19. The apparatus according to claim 18, wherein the one or more processors are configured to embed at least a portion of the selected prefetch updates in one or more of the prefetch notifications sent to the user device.

20. The apparatus according to claim 18, wherein the one or more processors are configured to embed a differential update of at least one of the selected prefetch updates in one or more of the prefetch notifications sent to the user device.

21. The apparatus according to claim 18, wherein the one or more processors are configured to compress a selected prefetch update, and to embed the compressed prefetch update in one of the prefetch notifications sent to the user device.

22. The apparatus according to claim 18, wherein the one or more processors are configured to embed multiple portions of a content item in a plurality of the prefetch notifications sent to the user device.

23. The apparatus according to claim 18, wherein the one or more processors are configured to evaluate a predefined criterion that decides whether or not to restrict the selected prefetch updates to be chosen only from among the requested prefetch updates.

24. The apparatus according to claim 23, wherein the one or more processors are configured to evaluate the predefined criterion based on one or more of:
   a time-of-day;
   a quality of a network connection with the user device;
   a type of the network connection;
   a cost of transferring data to the user device;
   an estimated likelihood that the selected prefetch update will be requested by a user of the user device;
   a battery level of the user device;
   an indicator signaled from the user device;
   a currently applied prefetching mode.

25. The apparatus according to claim 18, wherein the one or more processors are configured to evaluate a predefined criterion that decides whether or not to embed a selected prefetch update in the prefetch notifications.

26. The apparatus according to claim 25, wherein the one or more processors are configured to evaluate the predefined criterion by verifying whether a size of the selected prefetch update fits an available space in one or more prefetch notifications that are to be sent to the user device.

27. The apparatus according to claim 18, wherein the one or more processors are configured to deliver a prefetch update for an item by:
   delivering to the user device a difference between an updated version of the item and a previous version of the item that is already available in the user device, and sending to the user device a first signature calculated over the updated version; and
   in the user device, reconstructing the updated version based on the previous version and the difference, calculating a second signature over the reconstructed updated version, and verifying the reconstructed updated version by comparing the first and second signatures.

28. The apparatus according to claim 18, wherein the one or more processors are configured to deliver a prefetch update for an item by sending to the user device a sequence of differential prefetch updates, and, in response to detecting an error in at least one of the differential prefetch updates, to resend one or more of the differential prefetch updates or resend the prefetch update non-differentially.

29. The apparatus according to claim 28, wherein the one or more processors are configured to send the differential prefetch updates with corresponding version numbers, and to detect the error by detecting a discrepancy in the version numbers.

30. The apparatus according to claim 18, wherein the one or more processors are configured to detect in the user device an error in a received prefetch update for an item, by reconstructing the item from the received prefetch update, and detecting a deviation from an expected structure of the item.

31. The apparatus according to claim 18, wherein the one or more processors are configured to deliver the non-requested prefetch updates only by embedding the non-requested prefetch updates in the prefetch notifications.

32. The apparatus according to claim 18, wherein the one or more processors are configured to deliver in the non-requested prefetch updates only prefetch policy updates and not content updates.

33. The apparatus according to claim 18, wherein at least some of the selected prefetch updates comprise content items that are available for prefetching.

34. The apparatus according to claim 18, wherein at least some of the selected prefetch updates comprise updates to a prefetch policy.

35. A computer software product, the product comprising a tangible non-transitory computer-readable medium in which program instructions are stored, which instructions, when read by one or more processors, causes the one or more processors to:
   send, to a user device that runs prefetching software, over the network, prefetch notifications that notify the user device of prefetch updates, which were chosen by a network-side processor from among available prefetch updates that are available on a content source;
   receive from the user device over the network requests for one or more requested prefetch updates, selected by the prefetching software in the user device in response to the prefetch notifications; and
   cause the user device to cache both (i) updates that were requested by the prefetching software but not by a user of the user device, and (ii) updates that were neither requested by the prefetching software nor by the user, by delivering to the user device over the network selected prefetch updates, which comprise both (i) one or more of the requested prefetch updates, and (ii) one or more non-requested prefetch updates that are selected by the network-side processor from among the available prefetch updates not in response to any request from the user device.

* * * * *